United States Patent
Partin et al.

(10) Patent No.: US 11,301,972 B2
(45) Date of Patent: Apr. 12, 2022

(54) COLOR SATURATION ADJUSTMENT IN NON-UNIFORM COLOR SPACE

(71) Applicant: DOLBY LABORATORIES LICENSING CORPORATION, San Francisco, CA (US)

(72) Inventors: Alexander Partin, Chicago, CA (US); Kimball Darr Thurston, III, Wellington (NZ); Robin Atkins, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 303 days.

(21) Appl. No.: 16/485,404

(22) PCT Filed: Mar. 1, 2018

(86) PCT No.: PCT/US2018/020521
§ 371 (c)(1),
(2) Date: Aug. 12, 2019

(87) PCT Pub. No.: WO2018/160883
PCT Pub. Date: Sep. 7, 2018

(65) Prior Publication Data
US 2021/0287348 A1 Sep. 16, 2021

Related U.S. Application Data

(60) Provisional application No. 62/466,952, filed on Mar. 3, 2017.

(30) Foreign Application Priority Data

Mar. 3, 2017 (EP) ..................... 17159215

(51) Int. Cl.
*G06T 11/00* (2006.01)
*G06T 5/00* (2006.01)
(Continued)

(52) U.S. Cl.
CPC .... *G06T 5/009* (2013.01); *G06T 2207/10024* (2013.01); *G06T 2207/20208* (2013.01)

(58) Field of Classification Search
CPC combination set(s) only.
See application file for complete search history.

(56) References Cited

U.S. PATENT DOCUMENTS

| 5,305,094 A | 4/1994 | Belmares-Sarabis |
| 6,337,692 B1 | 1/2002 | Rai |
| (Continued) | | |

FOREIGN PATENT DOCUMENTS

| CN | 101715141 | 5/2010 |
| CN | 105323502 | 2/2016 |
| (Continued) | | |

OTHER PUBLICATIONS

Ebner, Fritz "Development and Testing of a Color Space (IPT) with Improved Hue Uniformity" The Sixth Color Imaging Conference: Color Science, Systems, and Applications, IS&T, Scottsdale, AZ, Nov. 1998, pp. 8-13.

(Continued)

*Primary Examiner* — Wesner Sajous

(57) ABSTRACT

A method for adjusting color saturation can determine a saturation adjustment from metadata that specifies an adjustment of color saturation based on a first display and from precomputed data, such as data in one or more look-up tables, that specifies a relationship between image data in a first color space and image data in a second color space. An input image in the first color space is converted into an image in the second color space, and the color saturation is adjusted while the image data is in the second color space, which can be a geometrically non-symmetrical color space.

16 Claims, 7 Drawing Sheets

(51) Int. Cl.
*G06T 5/50* (2006.01)
*G09G 5/02* (2006.01)
*G09G 5/10* (2006.01)
*H04N 1/60* (2006.01)
*H04N 9/68* (2006.01)
*H04N 19/30* (2014.01)
*H04N 19/46* (2014.01)

(56) References Cited

U.S. PATENT DOCUMENTS

| | | | |
|---|---|---|---|
| 7,180,524 B1 | 2/2007 | Axelrod | |
| 7,215,813 B2 | 5/2007 | Graves | |
| 7,599,551 B2 | 10/2009 | Takahashi | |
| 7,746,411 B1 | 6/2010 | Balram | |
| 8,022,964 B2 | 9/2011 | Pettigrew | |
| 8,159,500 B1* | 4/2012 | Bogart | H04N 1/6058 345/590 |
| 8,218,866 B2 | 7/2012 | Chu Ke | |
| 8,432,588 B2 | 4/2013 | Morovic | |
| 8,593,476 B2 | 11/2013 | Demos | |
| 8,860,751 B2 | 10/2014 | Sullivan | |
| 8,861,850 B2 | 10/2014 | Uslubas | |
| 9,077,994 B2 | 7/2015 | Miller | |
| 9,418,622 B2 | 8/2016 | Sullivan | |
| 10,540,920 B2 | 1/2020 | Atkins | |
| 2003/0012433 A1 | 1/2003 | Gruzdev | |
| 2005/0248581 A1 | 11/2005 | Choe | |
| 2009/0252410 A1* | 10/2009 | Chu Ke | H04N 9/68 382/167 |
| 2011/0234622 A1 | 9/2011 | Fujita | |
| 2015/0348249 A1 | 12/2015 | Yamamoto | |
| 2015/0358646 A1 | 12/2015 | Mertens | |
| 2016/0005153 A1* | 1/2016 | Atkins | H04N 9/67 345/591 |
| 2016/0005349 A1* | 1/2016 | Atkins | H04N 5/20 345/591 |
| 2016/0134872 A1 | 5/2016 | Su | |
| 2016/0205369 A1 | 7/2016 | Wallace | |
| 2017/0223367 A1* | 8/2017 | Stessen | G06T 5/009 |
| 2017/0330529 A1* | 11/2017 | Van Mourik | G09G 3/2003 |
| 2018/0013927 A1* | 1/2018 | Atkins | G09G 5/02 |
| 2018/0139429 A1* | 5/2018 | Park | G09G 5/10 |
| 2019/0311694 A1* | 10/2019 | Van Mourik | H04N 21/4854 |
| 2020/0013151 A1* | 1/2020 | Atkins | G06T 5/009 |

FOREIGN PATENT DOCUMENTS

| | | |
|---|---|---|
| JP | 2008219290 | 9/2008 |
| WO | 2014056679 A1 | 4/2014 |
| WO | 2018160883 | 9/2018 |

OTHER PUBLICATIONS

ITU-R BT. 2100 "Image Parameter Values for High Dynamic Range Television for Use in Production and International Programme Exchange" ITU, Jul. 2016.
ITU-R BT.2390-0 "High Dynamic Range Television for Production and International Programme Exchange" 2016.
Reinhard, E. et al "Color Imaging: Fundamentals and Application" 2008.
SMPTE 2084:2014 "High Dynamic Range Electro-Optical Transfer Function of Mastering Reference Displays" Aug. 16, 2014.
Vrhel, M. et al "Color Device Calibration: A Mathematical Formulation" IEEE Transactions on Image Processing, vol. 8, No. 12, Dec. 1999, pp. 1796-1806.
Wikipedia webpage : https://en.wikipedia.org/wiki/HSL_and_HSV.

* cited by examiner

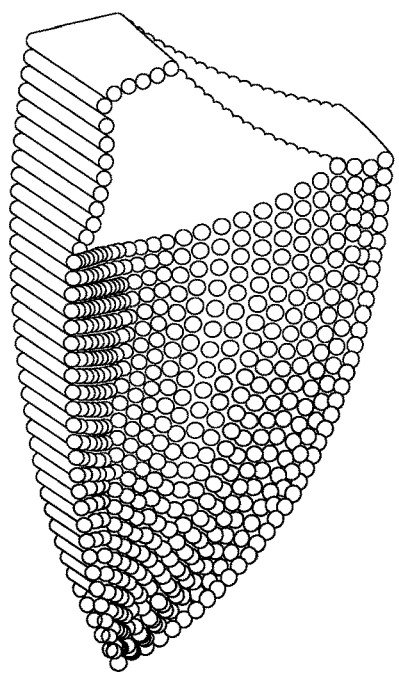
FIG. 4B
FIG. 4C
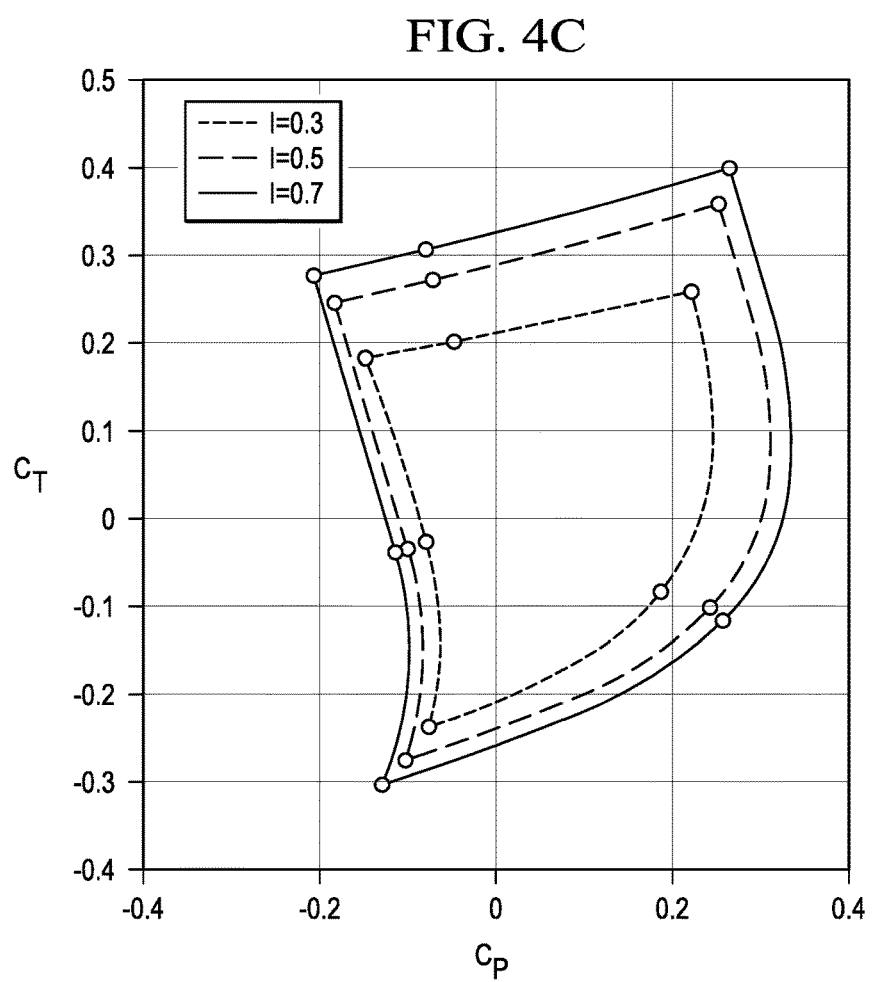

COLOR SATURATION ADJUSTMENT IN NON-UNIFORM COLOR SPACE

CROSS REFERENCE TO RELATED APPLICATIONS

This application claims priority to U.S. Provisional Application No. 62/466,952 and European Patent Application No. 17159215.7, both of which were filed on Mar. 3, 2017 and are incorporated by reference in their entirety herein.

BACKGROUND

This disclosure relates to image processing, such as image processing of color images in content such as movies, television shows, etc.

An image processing pipeline commonly refers to the operations applied to images starting from, in one case, the image source (e.g. camera) and ending at the image renderer (e.g. a television which includes a display that can be referred to as the target display). Although images are normally represented on the target display using the RGB color space, for processing purposes the image data often goes through multiple color space transformations in the image processing pipeline before being displayed on the target display. These color space transformations can include a transformation into an intermediate color space and a transformation from the intermediate color space to an RGB color space. These intermediate color spaces can have special characteristics that allow the desired processing to be performed while the image data is represented in the intermediate color space. For example, in the case of the Dolby Vision pipeline (from Dolby Laboratories), the RGB data is transformed into an IPT color space in order to perform a desired color volume mapping.

As used herein "IPT color space" refers to a Luma (I)-Chroma (P and T)-like space (like YCbCr). The original IPT space was described in "Development and testing of a color space (ipt) with improved hue uniformity", by F. Ebner and M. D. Fairchild, in Proc. 6th Color Imaging Conference: Color Science, Systems, and Applications, IS&T, Scottsdale, Ariz., November 1998, pp. 8-13 (to be referred to as the Ebner paper), which is incorporated herein by reference in its entirety. More recently, the final non-linearity in the Ebner paper was replaced by a perceptual quantizer (PQ) that better matches the properties of the human visual system. The PQ quantizer is described in U.S. Pat. No. 9,077,994, by J. S. Miller et al., which is incorporated herein by reference in its entirety, parts of which have been adopted by the SMPTE ST 2084:2014 specification, titled "High Dynamic Range Electro-optical Transfer Function of Mastering Reference Displays," Aug. 16, 2014, incorporated herein by reference in its entirety. In certain embodiments, IPT may refer to the ICtCp color space defined in the ITU-R Rec. BT. 2100-0 (07/2016), "Image parameter values for high dynamic range television for use in production and international programme exchange," which is incorporated herein by reference in its entirety. Like YCbCr, ICtCp is a color-opponent based encoding scheme intended to separate luma from chroma information. In addition, ICtCp offers constant intensity (CI) representation.

Oftentimes these intermediate color spaces are based on color models which separate the intensity and chroma components. Each color model or color space can have its own characteristics that are useful for a particular processing. For example, the HSV-type color spaces (e.g., HSV, HSL, HSI) have highly symmetric and uniform geometric shapes that allow convenient control of saturation and hue of colors. Alternatively, the IPT color space, which has a linearity of constant hue lines, provides a desired characteristic for color gamut mapping in high dynamic range (HDR) and wide color gamut applications. However, the IPT color space has a geometrically non-symmetrical color space shape that does not allow for the convenient control of saturation and hue of colors.

BRIEF DESCRIPTION OF THE DRAWINGS

The present invention is illustrated by way of example and not limitation in the figures of the accompanying drawings in which like references indicate similar elements.

FIG. 4B shows an example of an IPT color space volume.

FIG. 4C shows an example of the IPT color space volume at three different cross-sections perpendicular to the intensity (I) axis; it can be seen that the IPT color space is not geometrically symmetrical.

DESCRIPTION OF EXAMPLE EMBODIMENTS

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Six-Vector Grading of Color Saturation Adjustment

Color grading refers to the process of manipulating an image, such as an input image, to generate high quality images. Various color grading tools are available for colorists, such as colorist 16 shown in FIG. 1, to use to manipulate an image, and these color grading tools include six-vector grading and a Color Decision List (CDL) as defined by the American Society of Cinematographers (ASC).

Figure 3:
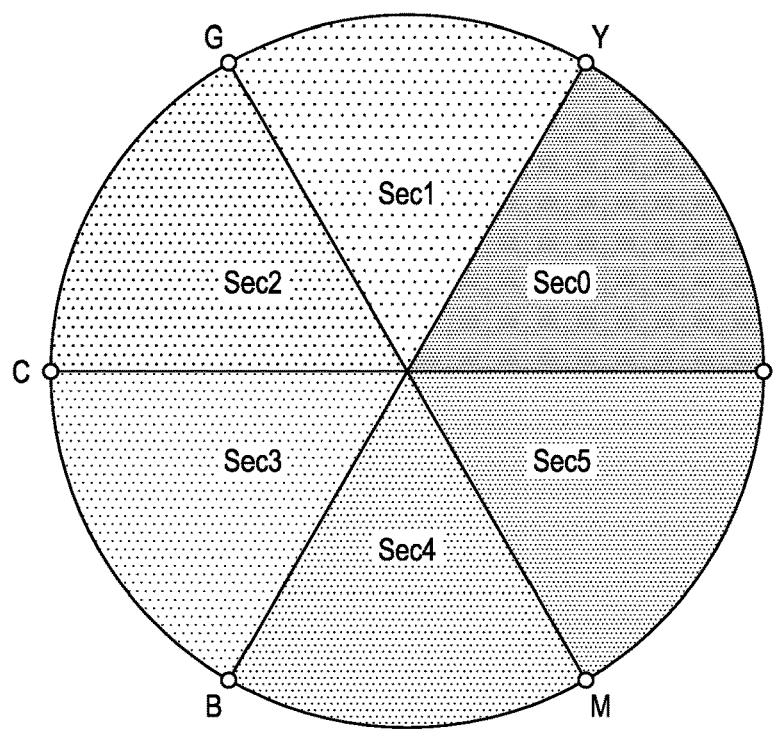
FIG. 3 shows an example of the six-vector color grading on a color wheel or chromaticity plane.

In six-vector saturation grading, a colorist can adjust six saturation controls where each control corresponds to the saturation of six colors, such as three primary colors (red, green, and blue) and three secondary colors (yellow, cyan, and magenta). The RGB (red, green, blue) colors can be represented on a circular chromaticity plane (which is often referred to as a color wheel), and such colors can be characterized by their saturation and hue values as shown in FIG. 3. Saturation is the distance (or magnitude) of a vector that originates from the axes origin (0,0) at the center of the circle (color wheel) shown in FIG. 3 to a particular coordinate on the color wheel, and hue is the angle that this vector creates with the positive horizontal axis.

In six-vector saturation grading, six vectors (R, Y, G, C, B, M) are defined on the color wheel at hue angles 0, 60, 120, 180, 240, and 300 degrees corresponding to red (R), yellow (Y), green (G), cyan (C), blue (B), and magenta (M), respectively. Each of these six vectors originates at the center of the color wheel and extends to the corresponding basic color at a point on the perimeter of the color wheel. Basic colors, illustrated as the color coded dots or points on the perimeter of the color wheel shown in FIG. 3, are therefore the end points of the six vector colors with the highest allowable saturation, determined by the color space that is employed. These six vectors define six sectors (Sec0, Sec1, Sec2, Sec3, Sec4, and Sec5) where each sector is bounded by the adjacent vectors (e.g., Sect) is bounded by the R and Y basic color vectors), and each sector resembles a triangular slice of the color wheel. These six vectors can be referred to as the six basic color vectors in the color wheel.

Figure 1:
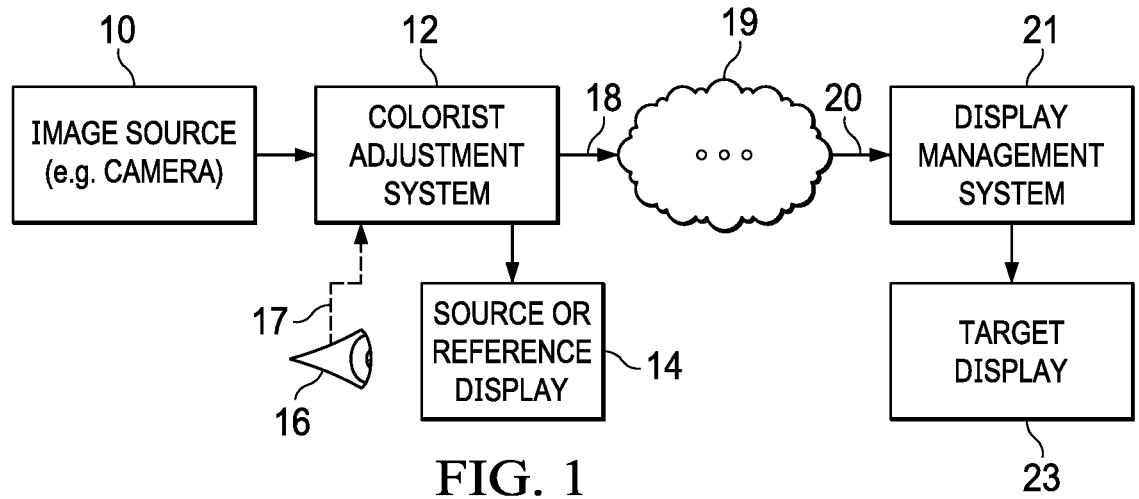
FIG. 1 shows an example of an image processing pipeline which can be used in one or more embodiments described herein.

Six saturation controls (R, Y, G, C, B, M) are available for a colorist, such as the colorist 16 shown in FIG. 1. Output saturation of a pixel color is calculated with an approach similar to summing vectors in an Euclidian space. For example, consider a pixel with chroma in Sect), such as a pixel with a hue of 45 degrees and a saturation of about one-half of the total distance between the center of the color wheel and the perimeter of the color wheel. In this case, only adjacent saturation controls R and Y affect the pixel's output saturation. Each of these adjacent saturation controls has a corresponding adjacent basic color vector, and each of these saturation controls is weighted with respect to the angle that the corresponding adjacent basic color vectors make with the pixel vector on the color wheel. The effect of this weighting can be explained by considering a pixel that is located very close to the basic color vector Y on the color wheel; such a pixel's saturation adjustment is mostly controlled by the effect of the saturation adjustment for the basic color vector Y and the effect of the saturation adjustment for the basic color vector R which will be minimal. The saturation adjustment for such a pixel (in sector Sec0) can be determined from the following equation:

$$S_{out}=S_{in}(1+R(Dr)+Y(Dy)), \quad \text{(Eq. 1)}$$

where $S_{out}$ represents the output saturation of the pixel, $S_{in}$ represents the original saturation of the pixel, R and Y represent the saturation controls (adjustment values) selected or defined by the colorist and can, in one embodiment, range from −1 to 1, and Dr and Dy represent the directivity coefficients that control the weight applied to each saturation control. In one embodiment, a colorist can select saturation controls on an image-by-image basis and can assign a value between −1.0 and +1.0 for each of the six saturation controls: R, Y, G, C, B, and M. In one embodiment, the directivity coefficients Dr and Dy can be computed using the pixel's hue, h (in degrees) and the hues h0 and h1 (both in degrees) for the corresponding adjacent basic color vectors R and Y respectively using the following equations:

$$Dr=(h-h1)/(h0-h1); \quad \text{(Eq. 2)}$$

$$Dy=(h-h0)/(h1-h0). \quad \text{(Eq. 3)}$$

Of course, image data for a pixel can be in any one of the six sectors, so the general example of these three foregoing equations can be represented as:

$$S_{out}=S_{in}(1+Sa0(D0)+Sa1(D1)); \quad \text{(Eq. 4)}$$

$$D0=(h-h1)/(h0-h1); \quad \text{(Eq. 5)}$$

$$D1=(h-h0)/(h1-h0), \quad \text{(Eq. 6)}$$

where $S_{out}$ represents the adjusted output saturation of the pixel, $S_{in}$ represents the original (prior to saturation adjustment) saturation of the pixel, Sa0 represents a colorist's saturation control or adjustment for one of the adjacent basic color vectors (the adjacent basic color vector having the smaller hue angle) and Sa1 represents a colorist's saturation control or adjustment for the other adjacent basic color vector, and D0 represents the directivity coefficient for the weight applied to the saturation control Sa0, and D1 represents the directivity coefficient for the weight applied to the saturation control Sa1, and h represents the pixel's hue (in degrees) and h0 and h1 represent the hues (in degrees) for the corresponding adjacent basic color vectors associated with Sa0 and Sa1 respectivh0ely.

Figure 4A:
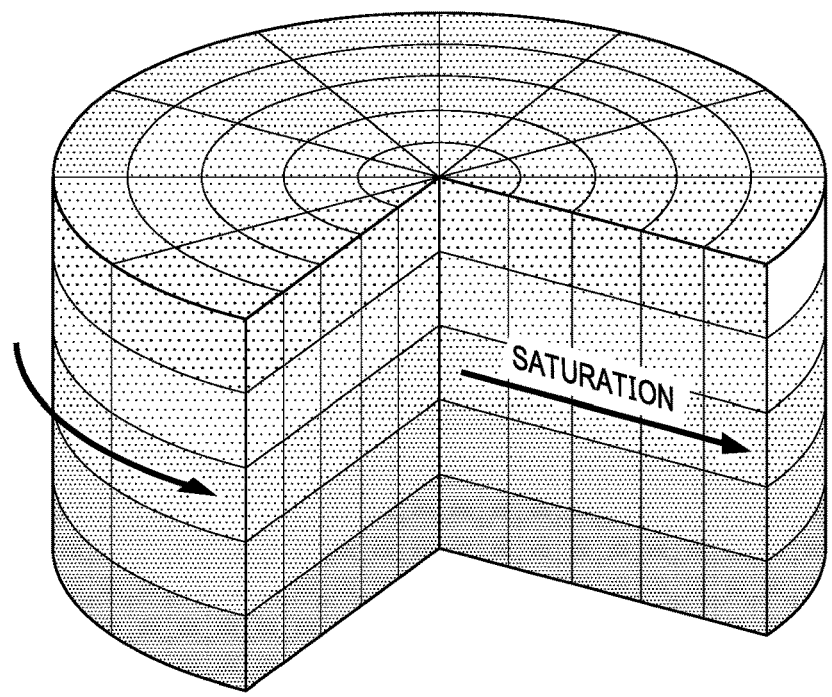
FIG. 4A shows an example of an HSV color space volume.

Six-vector saturation grading is designed to be used with HSV-type color spaces such as HSV, HSL, HSI, etc. These HSV-type color spaces are characterized by cylindrical color volumes which have uniform geometrically symmetrical properties and shape, allowing for a convenient implementation of color saturation grading. FIG. 4A shows an example of an HSV color volume which has a cylindrical color volume that is uniform and geometrically symmetrical. This HSV color volume allows for convenient implementation of color saturation grading while a color space such as an IPT-type color space (e.g. IPT or ICtCp or other variations based on an IPT-type space) do not allow for such a convenient implementation due to the non-uniform or geometrically non-symmetric color volumes. For example, FIG. 4B shows the non-uniformity of the IPT color volume; this IPT color volume or color space is not geometrically symmetrical. FIG. 4C also shows how non-uniform the IPT color space or volume is; in particular, FIG. 4C shows three cross-sections of the IPT color volume shown in FIG. 4B taken at three different intensities (which is defined along the Z axis in FIG. 4B). These three sections shown in FIG. 4C show how the IPT color volume is shaped in the P-T plane; P is along the x axis in FIG. 4C and T is along the y axis in FIG. 4C.

The embodiments described herein provide methods, systems, and computer readable media for using color saturation grading, such as, for example, six-vector color saturation in non-uniform color spaces such as IPT-type color spaces. These embodiments may be used to avoid modification to existing or future hardware in target displays and in display management systems that drive target displays.

Color Adjustment in Non-Uniform or Different Color Spaces

As indicated above, display management systems can use a non-uniform color space (or a color space that is different than a color space used by the colorist in the color grading process). These display management systems are often part of an image processing pipeline, such as the image processing pipeline in FIG. 1. The image processing pipeline in FIG. 1 can include an image source 10, such as a camera (which captures either video or still images), and image data representing an image is provided by the image source 10 to a data processing system, such as colorist adjustment system 12, that can be used by a colorist 16 to manipulate or adjust one or more captured images by providing one or more manipulation or adjustment inputs or commands 17. In one embodiment, a colorist, such as colorist 16, observes one or more images that are displayed by a source or reference display 14, and can interactively make adjustments (e.g., change color saturation) to the displayed image; in other words, the colorist 16 can observe an original (or previously adjusted) image and then make an adjustment (such as increasing or decreasing red saturation) by providing an adjustment command 17 to the colorist adjustment system 12 which in turn implements the adjustment command and renders and displays an adjusted image on the source or reference display 14. This process can continue until the colorist 16 is satisfied with the final adjusted image; at this point, the colorist 16 can save data that specifies the adjustment which can be a six-vector color saturation adjustment. The data can be saved as metadata that specifies the six-vector saturation adjustment (e.g. six values, one for each of R, Y, G, C, B, and M) for one or more images that have been color graded by the colorist, and this metadata, and the associated images, can be distributed by one or more distribution systems, such as a distribution system 19 which receives the output 18 from the colorist adjustment system 12. In one embodiment, the output 18 provides both the metadata and the associated images to the one or more distribution systems which in turn provide the metadata and associated images to one or more target displays that can each include a display management system. In the example shown in FIG. 1, the input 20 of the display management system 21 receives the metadata and associated images from the distribution system 19 and then uses the metadata to process the associated images as described further below to cause the display of content (e.g., movies, television shows, video games, etc.) on the target display 23. In one embodiment, the metadata can be static metadata that applies to all of the content while in another embodiment the metadata can be dynamic metadata that changes over time (such as, for example, a first scene or sequence in a movie (or other content) uses a first set of metadata for six-vector color saturation adjustment (or other type of adjustment) and a second scene or sequence in the movie (or other content) uses a second set of metadata for six-vector color saturation adjustment (or other type of adjustment)). The distribution system 19 can be any one or more of a variety of systems through which content can be distributed such as the Internet, or a wide area network or a local area network or a cable TV or satellite TV system or a game console or content player such as a DVD player, etc. FIG. 1 shows one example of an image processing pipeline that can be used with the one or more embodiments of the invention described herein, and other image processing pipelines can also be used with these embodiments, including the image processing pipelines described in the International Telecommunication Union's Report ITU-R BT.2390-0, "High dynamic range television for production and international programme exchange," (2016), and this Report is incorporated herein by reference.

Figure 2:
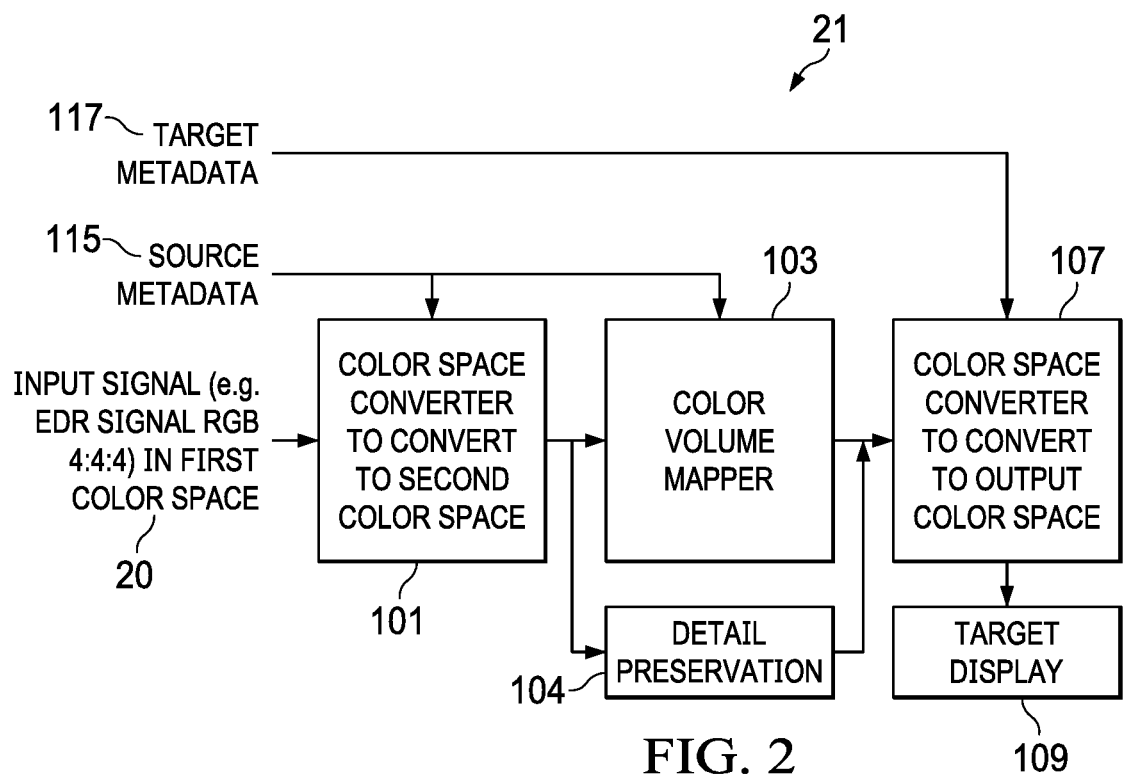
FIG. 2 shows an example of a display management system that provides images for output on a target display.

FIG. 2 shows more detail about an example of a display management system 21 which can be used with one or more embodiments of the invention. As shown in FIG. 2, the display management system 21 can include a color space converter 101, a color volume mapper 103, a detail preservation unit 104, and a color space converter 107 which is coupled to drive the target display 109 which can be the same as target display 23 in FIG. 1. The display management system 21 can receive, through one or more inputs such as input 20, image data for the content and can also receive numerous types of metadata, such as metadata describing one or more color saturation adjustments and source metadata 115 describing characteristics of the source display(s) which created or adjusted the images and target metadata 117 describing characteristics of the target display, such as target display 109. The color space converter 101 in one embodiment can be a converter that converts image data in one color space (e.g., an RGB-type color space) to image data in another color space (e.g., an IPT-type color space), and the color space converter 101 receives the image data for the images in the content and converts the image data and provides the converted image data (as image data in, for example, an IPT-type color space) to both the color volume mapper 103 and the detail preservation unit 104. The color volume mapper 103 in one embodiment can perform color gamut volume mapping from the color gamut of the source display (as specified in the source metadata 115) to the color gamut of the target display 109; often, the source display (e.g. source display 14) can be a reference display that can have a very wide color gamut that is larger than the color gamut of a target display, such as the target display 109, and the color volume mapper 103 maps image data from the source's color gamut to the target's color gamut. In one embodiment, the color volume mapper 103 can also include a tone mapping unit that maps intensity (or luminance) values in the input image data in the second color space (which have the dynamic range of the source display) to intensity (or luminance) values in the dynamic range of the target display. The detail preservation unit 104 can, in one embodiment, restore high-frequency details in the intensity channel (intensity or luminance values) that can be lost due to tone mapping by the tone mapping unit. The color space converter 107 in one embodiment receives tone mapped and volume mapped image data from the color volume mapper 103 and detail preservation unit 104 and performs a color space conversion to convert the mapped image data in the second color space (e.g. IPT-type color space) into image data in the output color space (e.g., an RGB-type color space). Then, the output image can be provided from the converter 107 to the target display 109. In one embodiment, the display management system 21 can be part of a target device (that is coupled to the target display) which supports Dolby Vision technology from Dolby Laboratories, and this technology can permit the distribution of high or very high dynamic range and wide color gamut content, based on reference systems that can create such content, to target systems that have smaller dynamic ranges or smaller color gamuts while retaining high quality images. Further information about such technology and IPT-type color spaces can be found in published US patent application US 2016/0005349 which is incorporated herein by reference.

Figure 5:
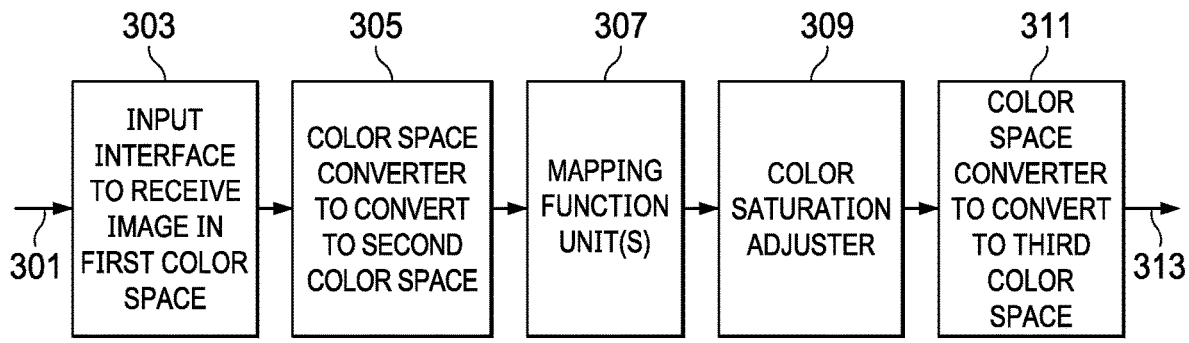
FIG. 5 shows an example of a display management system according to one or more embodiments of the invention described herein.

FIG. 5 shows another example of a display management system, such as display management system 21 in FIG. 1, that includes a color saturation adjuster 309 that adjusts color saturation according to one or more of the embodiments of the invention described herein. For example, the color saturation adjuster 309 can adjust color saturation using the method shown in FIG. 6 or the method shown in FIG. 7A and using color saturation metadata provided by, for example, a colorist during a color grading process. The display management system in FIG. 2 can also include such a color saturation adjuster in some part of the image processing pipeline shown in FIG. 2. The display management system shown in FIG. 5 includes an input interface 303 that receives input image data and related metadata and source display metadata, in one embodiment, from input 301 (which is similar to input 20 in FIGS. 1 and 2) and also includes a color space converter 305, a mapping function unit(s) 307, the color saturation adjuster 309, and a color space converter 311 that can provide an output image (directly or indirectly) to a target display (such as target display 23 or 109) through output 313. The input interface 303 can be a network interface, such as an Ethernet or WiFi interface, or a cable TV or satellite TV interface or other hardware interfaces known in the art that can provide content and associated metadata. The input interface can receive the image data which represents the content (e.g., movies, video games, television shows, etc.) and can also receive any associated metadata such as source metadata 115 and target metadata 117 and color saturation adjustment metadata (e.g., the saturation controls Sa0, Sa1, etc. for use in Equation 4), etc. The input interface 303 can then provide the received data to various components in the display management system shown in FIG. 5; for example, the input image data and source metadata can be provided to the color space converter 305 which converts the image data of an input image from image data in the first color space (e.g., an RGB-type color space) to image data in a second color space (e.g., an IPT-type color space). The converter 305 can be similar to converter 101 in FIG. 2. The converted image data can then be provided from the converter 305 to the mapping function(s) unit 307 which can be similar, in one embodiment, to the color volume mapper 103 and the detail preservation unit 104; the mapping function(s) unit 307 can perform color volume mapping and tone mapping and optionally also detail preservation and provide an output of the mapped image data (still in the second color space) to the color saturation adjuster 309 which can then adjust the color saturation of one or more images using the one or more embodiments of the invention, such as the methods of FIG. 6 or FIG. 7A. Then, the color saturation adjuster 309 can output color saturation adjusted image data (still in the second color space) to the color space converter 311 which can then convert the color saturation adjusted image data into image data in a third color space, such as an RGB-type color space, that is output at output 313 to drive a target display, such as target display 23 (or target display 109).

Figure 6:
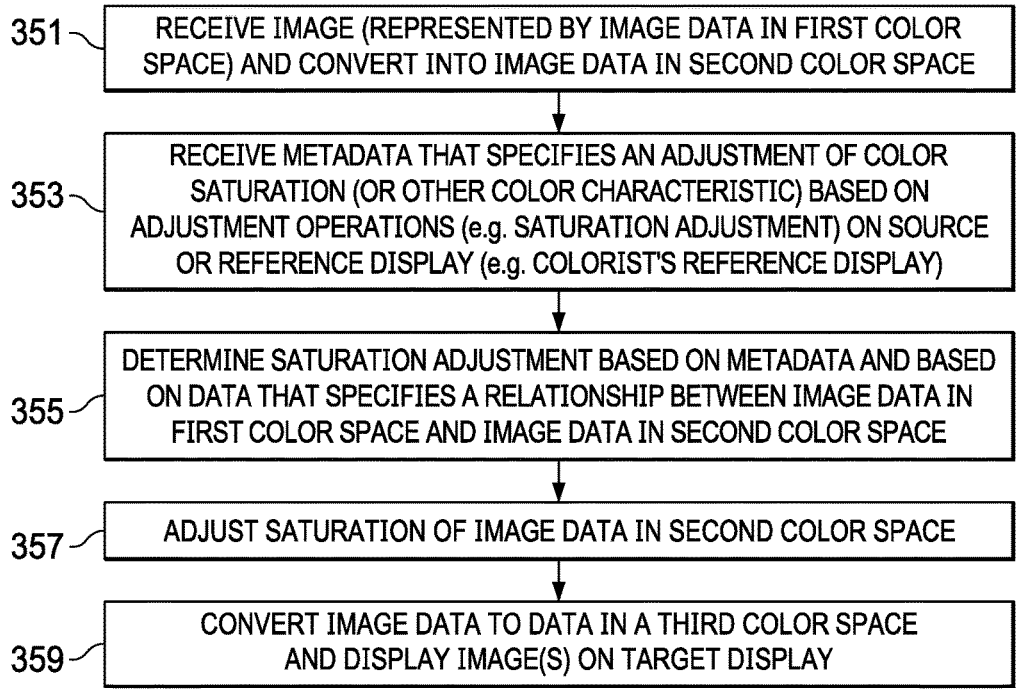
FIG. 6 is a flowchart that shows a method according to one or more embodiments of the invention.

FIG. 6 shows a method according to one embodiment of the invention. The method can begin in operation 351 in which a display management system can receive one or more images for content and convert the image data (in a first color space) that represents the images into image data in a second color space; in one embodiment, the first color space can be an RGB-type color space and the second color space can be an IPT-type color space. In one embodiment, the IPT-type color space is used in order to perform color volume mapping and tone mapping in the IPT-type color space (such as ICtCp), rather than performing these mappings in other color spaces. In operation 353, metadata that specifies an adjustment of color saturation (or other color characteristic) is received by the display management system (such as the systems shown in FIG. 2 or 5). In one embodiment, the metadata includes the saturation controls R, Y, G, C, B, and M that are used for six-vector saturation grading described herein (see, e.g., Equations 4-6); in another embodiment, the metadata includes the saturation controls for a four-vector saturation grading method that use quadrants (or other sector geometries). In one embodiment, the metadata received in operation 353 is based on saturation adjustment operations on the source display (such as the colorist's source display 14). In operation 355, a set of saturation adjustments for the pixels in an image is determined based on the metadata received in operation 353 and based on data that specifies a relationship between image data in the first color space and image data in the second color space. This data (that specifies this relationship) can be precomputed at a colorist's system (or other system) and provided to a display management system (e.g., the system in FIG. 2 or 5) as metadata that is used to perform saturation adjustment at the display management system. In the case of the display management system shown in FIG. 5, the color saturation adjuster 309, in one embodiment, uses this data (that specifies a relationship between the two sets of image data) to determine which saturation controls (specified in the metadata) to use for each pixel; in other words, this data specifies the relationship between two sets of image data so that image data in the second color space can be properly associated to the saturation controls that would apply (or were used) in the first color space. In one embodiment, this data can be a set of one or more data structures that are used to determine, for a particular pixel, which pair of saturation controls (e.g., R and Y) in the metadata to use to adjust the saturation of the particular pixel. In one embodiment, this data can map the basic colors in the first color space to determine sector borders in the second color space so that the correct pair of saturation controls can be selected for a particular pixel which falls between two adjacent sector borders in the second color space. In other words, the basic colors (e.g., the six basic colors R, Y, G, C, B, M) in the first color space use image data projected from the first color space into the second color space to determine the sector borders in the second color space. In one embodiment, this data can be used for six-vector saturation grading, and in another embodiment another set of data that specifies a relationship between two sets of image data can be used for other types of saturation grading, such as four-vector saturation grading. After the saturation adjustment is determined in operation 355 for each pixel in an image, the display management system (e.g., color saturation adjuster 309) in operation 357 adjusts the saturation of the image in the second color space, and then the saturation adjusted image is converted, in operation 359, into a third color space (e.g., an RGB-type color space) and then displayed on a target display, such as target display 109 or 23.

Figure 7A:
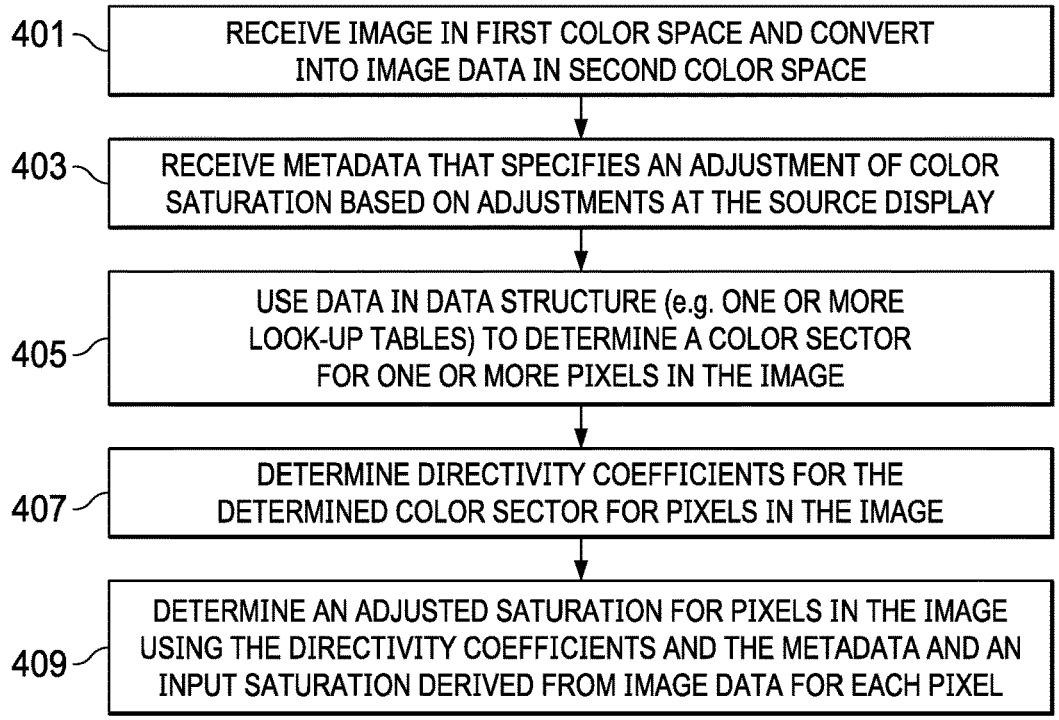
FIG. 7A is a flowchart that shows another method according to one or more embodiments of the invention.

FIG. 7A shows another method according to one embodiment of the invention. In operation 401, an image represented by image data in a first color space (e.g., an RGB-type color space) is received and is converted into image data in a second color space (e.g., an IPT-type color space). In operation 403, metadata is received, and this metadata specifies an adjustment of color saturation based on, for example, adjustments made by a colorist (e.g., colorist 16 in FIG. 1). In an embodiment that uses six-vector saturation grading for saturation adjustment, this metadata can be the six saturation controls R, Y, G, C, B, M specified by a colorist for the image. In operation 405, the display management system (e.g. the color saturation adjuster 309) uses data in a data structure (such as data structure 501 which can be one or more LUTs shown in FIG. 8) to determine a color sector for each pixel in an image in order to adjust the saturation of the image. In one embodiment, for each pixel in the image, the I (intensity) value determines a row of data in the LUTs, and then data in this row is used, as described further below, to determine the color sector for the pixel (which in turn determines the two adjacent saturation controls for the pixel). In operation 407, directivity coefficients (such as D0 and D1 described above) are determined for the pixel that is within the determined color sector. Then in operation 409, an adjusted saturation for each pixel is determined by using the metadata (e.g., saturation controls for the determined color sector) and the determined directivity coefficients and the input saturation of the pixel.

A specific example of an embodiment that uses operations 405, 407, and 409 will now be described. In this specific example (which uses six-vector color saturation adjustment), the metadata specifies the six saturation controls (R, Y, G, C, B, M) defined by a colorist for the image, and each of these six saturation controls can have a value between, in one embodiment, −1.0 (complete desaturation) and +1.0 (maximum saturation), where a value of zero represents no change in saturation. In one embodiment, operations 405, 407, and 409 are performed for each pixel in the image and the metadata applies to the entire image. In one embodiment, the second color space is an IPT-type color space (e.g., ICtCp) and the I value of a pixel is used to select a row in the 3 LUTs (see FIG. 8) in order to determine the color sector of the pixel. The IPT values of the pixel in one embodiment will have already been processed by the mapping functions in unit 307 so that the IPT values will have been tone mapped and volume mapped. The I value of the pixel is matched to the best match (closest in value) of I values in the LUT 503, which exists in the row which becomes the selected row (e.g., row 509) for the pixel. The selected row includes a set of hues (angles) in the LQ LUT 505 that were determined, as described below, for the six basic color vectors shown in FIG. 3. The hue value (h) of the pixel is an angle and is calculated from the value of arctan (T/P), where arctan is the inverse tangent and the T and P values are the mapped chroma components of the pixel in the IPT-type color space. The calculated hue value (h=arctan (T/P)) of the pixel is then compared to the set of hue values in the selected row in the LQ LUT 505 to determine the color sector for the pixel; in particular, h is compared to the set of hue values in the selected row to determine adjacent hue angles such that h0≤h≤h1 where h0 and h1 are the angles of the adjacent sector borders and h0 and h1 define the color sector in IPT space. In other words, the determined color sector is defined by the hues of the two adjacent basic color vectors that bound the color sector. For example, in the case of Equation 1, the two adjacent basic color vectors are R and Y. The directivity coefficients D0 and D1 can then be determined using Equation 5 and 6 respectively. The input saturation ($S_{in}$) for the pixel can be determined using the equation $$S = \sqrt{T^2 + P^2};$$

the adjusted sanitation ($S_{out}$) can then be calculated using Equation 4. The adjusted saturation value for the pixel is converted back to T and P values. In one embodiment, the conversion of the adjusted saturation value back to T and P values for the pixel can be determined by using the following equations:

$$P_{out}=S_{out}[\cos(h)];\text{ and}$$

$$T_{out}=S_{out}[\sin(h)].$$

Then the adjusted saturation of the image data for the pixel is converted into an RGB-type color space to allow the image to be displayed on the target display.

Figure 7B:
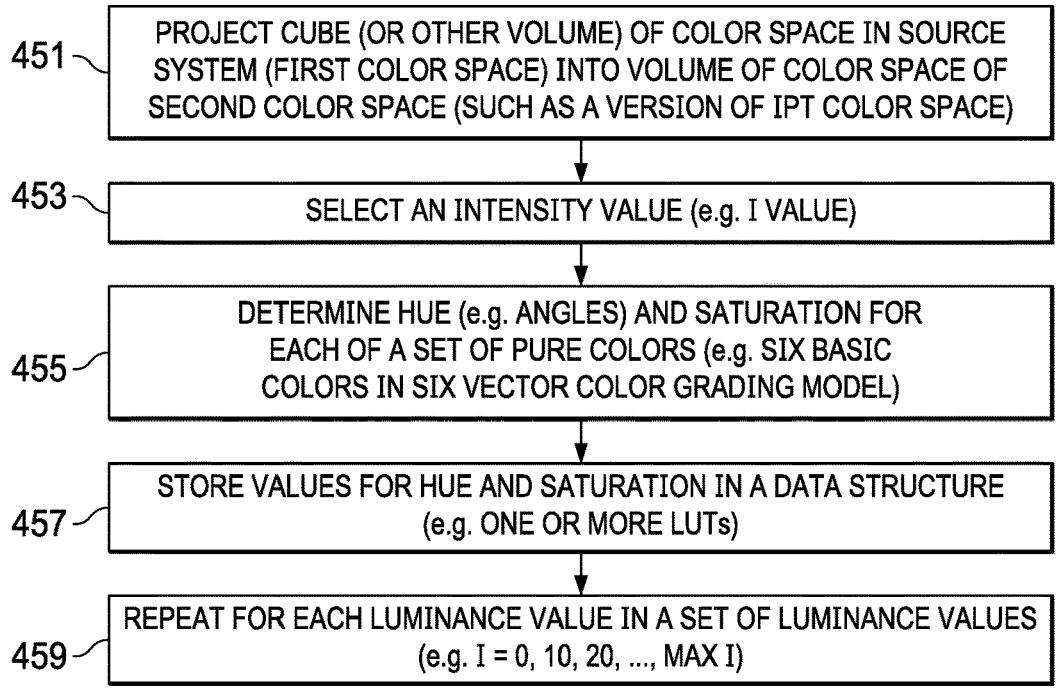
FIG. 7B is a flowchart that shows a method for deriving a data structure (such as one or more look-up tables) for use with one or more embodiments of the invention.
Figure 8:
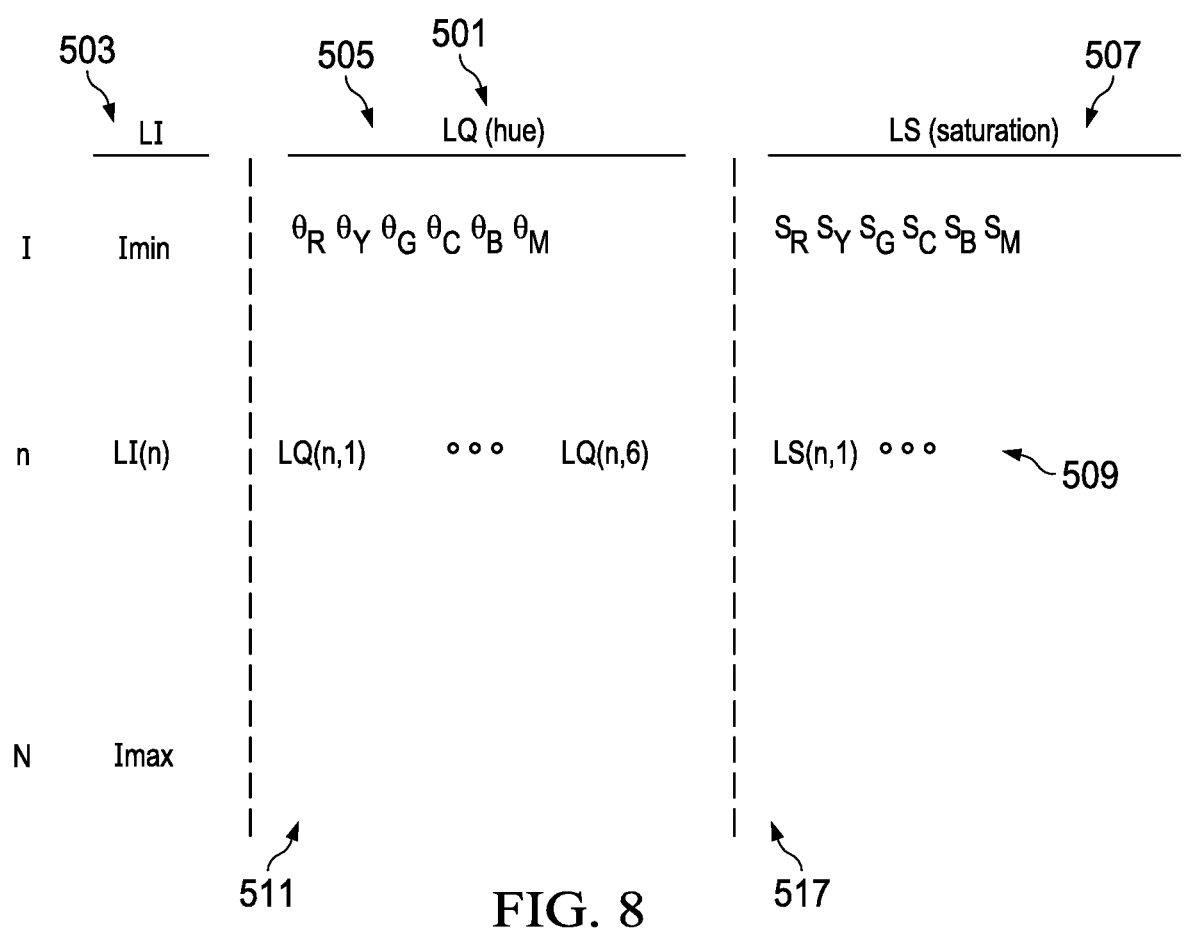
FIG. 8 shows an example of a set of look-up tables (LUTs) that can be used with one or more embodiments of the invention.

FIG. 7B shows a method for creating the look-up tables (LUTs) 503, 505, and 507, which are part of the data structure 501 shown in FIG. 8. In one embodiment, this method shown in FIG. 7B is performed once on a data processing system that provides the LUTs to a plurality of display management systems, and in one embodiment, the LUTs do not depend on images in the content and the content of the LUTs is a function of the source display that is coupled to the data processing system that creates the LUTs. This data processing system can be a colorist's adjustment system and the content of the LUTs is distributed through the distribution system 19. In operation 451, a cube (or other volume) of a color space volume in the first color space (e.g., RGB) in the source system is projected into a color space volume of the second color space (e.g., IPT); this projection can involve a color space transformation of image data for a selected set of possible colors in the first color space (e.g., the possible colors can include the six basic colors on the perimeter of the color wheel shown in FIG. 3 for all possible luminance values in a set of luminance values), and this color space transformation transforms the image data for these possible colors into image data for these possible colors in the second color space which can be an IPT-type color space (e.g., ICtCp). This projection provides a set of corresponding image values for each possible color (in the selected set of possible colors) in both color spaces; for example, for a given luminance value or intensity value, there is basic red color image data in both color spaces. In operation 453, an intensity value is selected and this effectively selects a chromaticity plane in the second color space (e.g., ICtCp) (see three such planes in FIG. 4C). Then in operation 455, hue (an angle) and saturation (a maximum magnitude) are determined in the selected chromaticity plane in the second color space for each of the six (or other number of) basic colors projected from the first color space (e.g., RGB) into this chromaticity plane; in other words, in one embodiment the six basic colors (e.g., six points on the perimeter of the color wheel in FIG. 3) for the selected intensity value are projected (color transformation) into the second color space to determine the color sector borders in this chromaticity plane in the second color space. The six basic color points can be "placed"/"plotted" into this chromaticity plane to then allow a calculation/measurement of the hue (angle) and saturation for each of the six basic color points, and these six basic color points define these color sector borders. The values for the selected intensity and the hues and saturations determined in operation 455 can then be stored in a data structure such as the three LUTs 503, 505, and 507; for example, the selected I (intensity) value is stored in a row (e.g., in row 509) in LUT 503 and six hues are stored in the same row in LUT 505 and six maximum saturation values are stored in the same row in LUT 507. Each hue can be associated with one of the corresponding basic colors and stored in the column for that basic color; for example, the determined hue for the red basic color is stored in column 511 (under the label θ5) and the determined hues for the other basic colors yellow, green, cyan, blue, and magenta are stored in the respective columns that are labeled $\theta_Y$, $\theta_G$, $\theta_C$, $\theta_B$, and $\theta_M$. Similarly, the determined maximum saturation value for red is stored in column 517 and the determined saturations for the other basic colors (Y, G, C, B, and M) are stored in the respective columns that are labeled $S_Y$, $S_G$, $S_C$, $S_B$, and $S_M$. Operation 459 shows that each of operations 453, 455, and 457 are repeated for each intensity (I) value in the LUT 503 to populate each row of LUTs 503, 505, and 507 with data. Thus, the LUTs 503, 505, and 507, once completed, can be provided to display management systems as precomputed data (for a given source display). The LUT 505 contains the hue values for the six basic colors across a set of possible I values, and the LUT 507 contains the maximum saturation values for the six basic colors across the set of possible I values. The LUTs can be organized as shown to provide intensity and basic color values (hue and saturation) based on the row index. In use (e.g., when the color saturation adjuster 309 uses the data structure 501), the I value of the image data of a pixel is used to obtain the I value in LUT 503 which is closest to the I value of the pixel and this selects the row for that pixel in the image.

In addition to color saturation adjustment using six-vector color grading, the one or more embodiments of the invention can be used with other types of color saturation such as a four-vector saturation control. In one alternate embodiment, a four-vector saturation control is used and includes four sectors instead of the six sectors of the six-vector color grading approach; in other words, the sectors can be defined by the angles (in degrees) of: 0, 90, 180, and 270. This can simplify the process of determining the location of a pixel relative to the sectors by locating the pixel in a quadrant rather than a triangular slice. This four-sector saturation control can also provide a more perceptually relevant saturation adjustment because human vision is often modeled as having four unique hues (yellow-blue, green-red) which aligns to the Ct and Cp axes of the ICtCp color space. A variation of the four-vector saturation control can use a rotated set of PT components; in particular the P and T components in the IPT chromaticity plane can be first rotated by some angular vector and then the four-vector saturation control can be applied. This allows customized control over the direction of the saturation adjustment. For example, the rotation may align the yellow axis more precisely with the unique hue for yellow, or a preferred direction to control. The rotation can be applied using a rotation matrix, for example:

$$\frac{P'}{T'} = \frac{\cos(\alpha) - \sin(\alpha)}{\sin(\alpha) - \cos(\alpha)} \binom{P}{T}.$$

Figure 9:
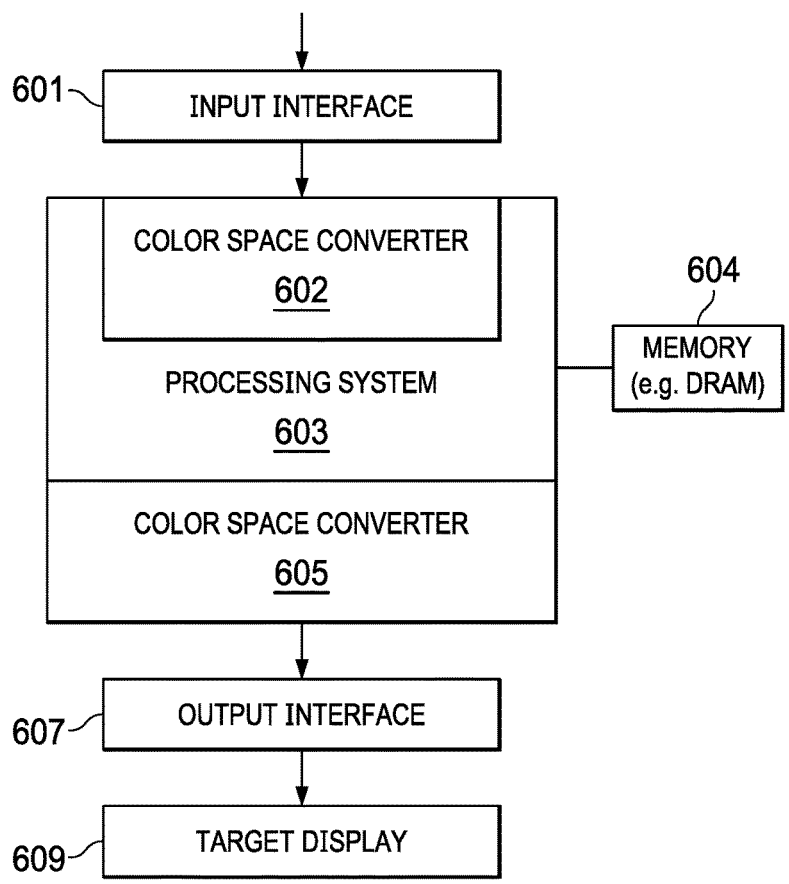
FIG. 9 shows an example of a display management system which can include both hardware and software components.

FIG. 9 shows an example of the components of a display management system. This example typically includes hardware processing systems (either general purpose processor(s) or some special purpose processors(s)) and memory and input and output interfaces. The general purpose processor(s), if present can be programmable (by software instructions which execute on the processor(s)).

The input interface 601 can be a network interface (e.g., Ethernet or WiFi) or a cable TV interface or satellite TV interface, and the input interface 601 receives, in one embodiment, the input 20 or input 301, and provides this input to color space converter 602 which can be implemented in either general purpose programmable hardware or special purpose hardware contained within processing system 603, which is coupled to memory 604. Memory 604 can store images and metadata (e.g. source metadata 115, target metadata 117, and the color saturation control metadata and the LUTs 503, 505, and 507). The color space converter 602 can perform the color space transformation in operations 351 or 401. The processing system 603 can perform the operations of the mapping function unit(s) 307 and the color saturation adjuster 309 and then provide an output to the color space converter 605 that converts the image data into the color space used by the target display 609 which receives the converted image through a hardware interface 607 (e.g., an HDMI interface or other known interfaces).

Figure 10:
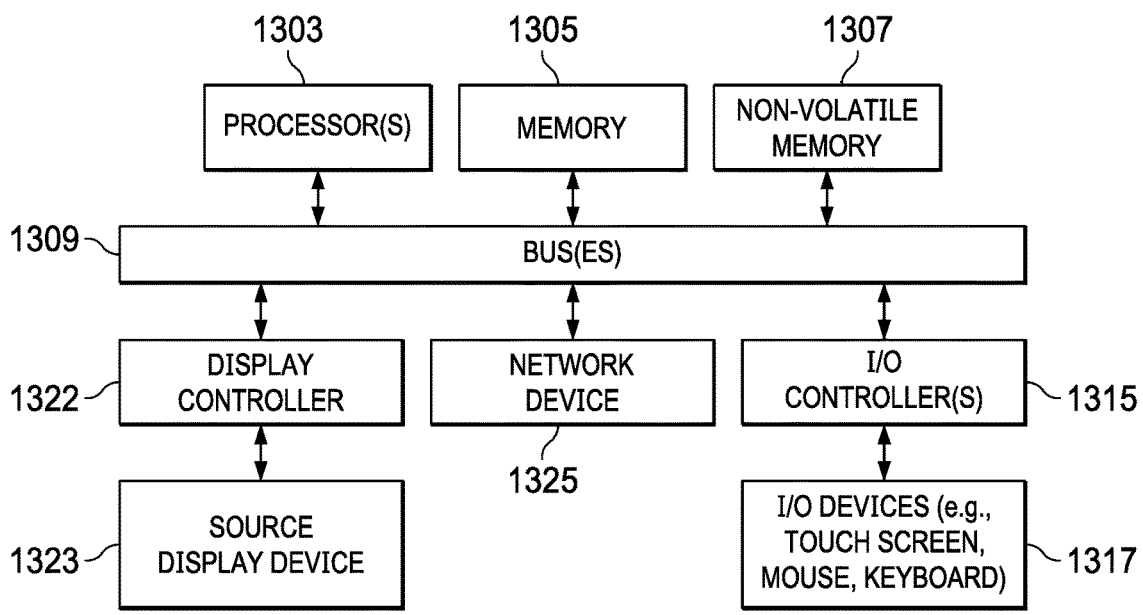
FIG. 10 shows an example of a data processing system that can be used by a colorist to create data for the color saturation adjustments described herein.

FIG. 10 shows an example of a data processing system that can be used by a colorist; thus, FIG. 10 is an example of a color adjustment system 12. The systems and methods described herein can be implemented in a variety of different data processing systems and devices, including general-purpose computer systems, special purpose computer systems, or a hybrid of general purpose and special purpose computer systems. Data processing systems that can use any one of the methods described herein include desktop computers, laptop computers, tablet computers, embedded electronic devices, or other electronic devices.

FIG. 10 is a block diagram of data processing system hardware according to an embodiment. Note that while FIG. 10 illustrates the various components of a data processing system, it is not intended to represent any particular architecture or manner of interconnecting the components as such details are not germane to the present invention. It will also be appreciated that other types of data processing systems that have fewer components than shown or more components than shown in FIG. 10 can also be used with one or more embodiments the present invention.

As shown in FIG. 10, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a source display device 1323. The source display device 1323 can include an integrated touch input to provide a touch screen. The data processing system can also include one or more input/output (I/O) controllers 1315 which provide interfaces for one or more I/O devices, such as one or more mices, touch screens, touch pads, joysticks, and other input devices including those known in the art and output devices (e.g. speakers). The colorist can use the one or more input devices to adjust saturation for one or more images. The input/output devices 1317 are coupled through one or more I/O controllers 1315 as is known in the art.

While FIG. 10 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WiFi, Bluetooth) that receive images from a camera, etc.

It will be apparent from this description that one or more embodiments of the present invention may be embodied, at least in part, in software. That is, the techniques may be carried out in a data processing system in response to its one or more processors executing a sequence of instructions contained in a storage medium, such as a non-transitory machine-readable storage medium (e.g. DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Various aspects of the present invention may be appreciated from the following enumerated example embodiments (EEEs):

EEE 1. A machine implemented method comprising:
receiving, for each pixel in a plurality of pixels, first image data in a first color space;
converting the first image data into second image data in a second color space;
receiving metadata that specifies an adjustment of color saturation based on adjustment operations on a first display;
determining a saturation adjustment from the metadata and from precomputed data that specifies a relationship between image data in the first color space and image data in the second color space; and
adjusting the saturation of the second image data using the saturation adjustment.

EEE 2. The method of EEE 1 further comprising:
converting the adjusted second image data into third image data in a third color space for display on a second display; and
displaying one or more images on the second display using the third image data.

EEE 3. The method of EEE 1 or EEE 2 further comprising:
applying a tone mapping function to image data based on the second image data in the second color space;
applying a color volume mapping function to image data based on the second image data in the second color space.

EEE 4. The method of any preceding EEE wherein the first color space is geometrically symmetrical in a chromaticity plane of the first color space, and wherein the second color space is not geometrically symmetrical in a chromaticity plane of the second color space.

EEE 5. The method of EEE 4 wherein the precomputed data specifies a sector in the chromaticity plane of the second color space for a selected value that represents intensity or luminance, and the selected value specifies the chromaticity plane in the second color space.

EEE 6 The method of any preceding EEE wherein the first display is a source or reference display used by a colorist to adjust saturation and derive the metadata.

EEE 7. The method of any preceding EEE wherein the first display has at least one of a larger color gamut or a higher dynamic range than the second display.

EEE 8. The method as in any preceding EEE wherein the second display is a television or monitor used by a viewer of content that includes the third image data.

EEE 9. The method as in any one of EEEs 1 to 8 wherein the second color space is an IPT or ICtCp color space and the third color space is an RGB color space.

EEE 10. A non-transitory machine-readable medium storing instructions which when executed by a system cause the system to perform a method as in any one of EEEs 1-9.

EEE 11. A machine-implemented method comprising:
accessing an input image in a first color space;
converting the input image into a first intermediate image in a second color space that is geometrically non-symmetrical;
storing data in one or more look-up tables (LUTs), the data generated to specify color sectors in the second color space relative to image data in the first color space;
receiving metadata that specifies an adjustment of color saturation based on adjustment operations on a first display;
applying a tone mapping transformation and a color volume mapping transformation to image data based on the first intermediate image to derive a second intermediate image in the second color space;
determining, for image data for each pixel in the second intermediate image, a color sector for the pixel from the data in the one or more LUTs;
determining one or more directivity coefficients for the determined color sector for each pixel; and
determining an adjusted saturation for each pixel in the second intermediate image using the one or more directivity coefficients and the metadata and an input saturation derived from image data for each pixel.

EEE 12. The method of EEE 11 wherein determining the adjusted saturation for each pixel produces a third intermediate image.

EEE 13. The method of EEE 12 further comprising:
converting the third intermediate image into an output image in a third color space; and
displaying the output image on a second display.

EEE 14. The method of any one of EEEs 11 to 13 wherein the color sector is one of: a triangular slice or a quadrant or other geometric portion of a chromaticity plane in the second color space.

EEE 15. The method of any one of EEEs 11 to 14 wherein the first color space is geometrically symmetrical in a chromaticity plane of the first color space and the second color space is not geometrically symmetrical in a chromaticity plane of the second color space.

EEE 16. The method of any one of EEEs 13 to 15 wherein the first display is a source or reference display used by a colorist to adjust saturation and derive the metadata, and wherein the first display has at least one of a larger color gamut or a higher dynamic range than the second display.

EEE 17. The method of any one of EEEs 13 to 16 wherein the second color space is an IPT or ICtCp color space and the third color space is an RGB color space.

EEE 18. A non-transitory machine-readable medium storing instructions which when executed by a system cause the system to perform a method as in any one of EEEs 11-17.

EEE 19. A data processing system for presenting content to a viewer, the data processing system comprising:
- an input interface to receive an image in a first color space and metadata that specifies an adjustment of color saturation based on adjustment operations on a first display;
- a color converter, coupled to the input interface, to convert the image into a first intermediate image in a second color space that is geometrically non-symmetrical;
- a memory, coupled to the input interface, to store the first intermediate image and to store data in one or more look-up tables (LUTs), the data generated to specify color sectors in the second color space relative to image data in the first color space, and the memory to store the metadata;
- a processing system coupled to the memory, the processing system configured to determine, for image data for each pixel in the image, a color sector for the pixel from the data in the one or more LUTs, and the processing system configured to determine one or more directivity coefficients for the determined color sector for each pixel, and the processing system configured to determine an adjusted saturation for each pixel in the image using the one or more directivity coefficients and the metadata and an input saturation derived from image data for each pixel.

EEE 20. The data processing system of EEE 19 wherein the input interface is a hardware network interface or a hardware port and wherein the processing system comprises one or both of one or more special purpose processors or one or more general purpose programmable processors, and wherein the color converter is part of one or both of the special purpose processors or the general purpose programmable processors.

The invention claimed is:

1. A machine implemented method of saturation-adjusting one or more images, the method comprising:
- receiving an image encoded in an enhanced dynamic range format associated with a second colour space, wherein the second colour space is one of: a $Y'C_BC_R$ colour space; a $YC_BC_R$ colour space; an IPT colour space; and an ICtCp colour space, the image comprising a plurality of pixels, each of the pixels having an intensity component and two chroma components;
- receiving colour grading metadata associated with the image, the colour grading metadata comprising a plurality of saturation control values corresponding to respective different hues, the plurality of saturation control values i) representing a desired saturation adjustment and ii) defining a first plurality of hue regions of a first colour space, the first colour space being different from the second colour space;
- for each pixel of the plurality of pixels,
  - determining the pixel's hue and saturation from its two chroma components,
  - determining a pixel saturation adjustment in accordance with the desired saturation adjustment, wherein the plurality of saturation control values have different contributions to the pixel saturation adjustment depending on the location of the respective pixel's hue relative to a second plurality of hue regions in the second colour space, the second plurality of hue regions corresponding one-to-one to the first plurality of hue regions, and
  - applying the pixel saturation adjustment to the pixel's saturation; and
- outputting a colour-graded image in the enhanced dynamic range format, the colour-graded image comprising the saturation-adjusted plurality of pixels.

2. The method of claim 1 wherein said determining each of the pixel saturation adjustments comprises locating, within the second colour space, in dependence on the respective pixel's intensity, at least one hue region of the second plurality of hue regions.

3. The method of claim 2 wherein said determining each of the pixel saturation adjustments comprises determining that the respective pixel's hue lies within the at least one hue region.

4. The method of claim 3 wherein, in said determining each of the pixel saturation adjustments, only a subset of the saturation control values have non-zero contributions to the pixel saturation adjustment, the subset of the saturation control values corresponding to hues which bound the at least one hue region.

5. The method of claim 4 wherein said determining each of the pixel saturation adjustments comprises locating the respective pixel's hue within the at least one hue region.

6. The method of claim 5, wherein the respective contributions to the pixel saturation adjustment of the subset of the saturation control values depends on relative separation distances between the respective pixel's hue and the hues corresponding to the subset of the saturation control values.

7. The method of claim 2 wherein said locating, within the second colour space, in dependence on the respective pixel's intensity, the at least one hue region comprises:
- identifying a chromaticity plane of the second colour space, the chromaticity plane being specific to the respective pixel's intensity; and
- locating the at least one hue region in the chromaticity plane.

8. The method of claim 1 wherein the plurality of saturation control values is a sequence of six saturation control values, corresponding to the hues red, yellow, green, cyan, blue and magenta.

9. The method of claim 8 wherein each hue region of the first plurality of hue regions is a region of the first colour space which lies between adjacent hues of said different hues.

10. The method of claim 9, wherein the hue regions of the first plurality of hue regions are a red-yellow region; a yellow-green region; a green-cyan region; a cyan-blue region; a blue-magenta region; and a magenta-red region.

11. The method of claim 8 wherein each hue region of the second plurality of hue regions is a region of the second colour space which lies between adjacent hues of said different hues.

12. The method of claim 11, wherein the hue regions of the second plurality of hue regions are i) a red-yellow region; ii) a yellow-green region; iii) a green-cyan region; iv) a cyan-blue region; v) a blue-magenta region; and vi) a magenta-red region.

13. The method of claim 1 wherein the first colour space is one of: a hue, saturation, value (HSV) colour space; a hue, saturation, lightness (HSL) colour space; or a hue, saturation intensity (HSI) colour space.

14. A display management system comprising: an interface for receiving images and associated metadata encoded in an enhanced dynamic range format; and a processing system configured to perform the method of claim 1.

15. The display management system of claim 14, wherein the processing system is configured to convert the colour-graded image into a format having a different colour space.

16. A non-transitory computer readable medium comprising computer interpretable instructions which, when executed by a display management system comprising a processing system and an interface for receiving images and associated metadata encoded in an enhanced dynamic range format, configure the processing system to perform the method of claim 1.

\* \* \* \* \*